UNITED STATES PATENT OFFICE.

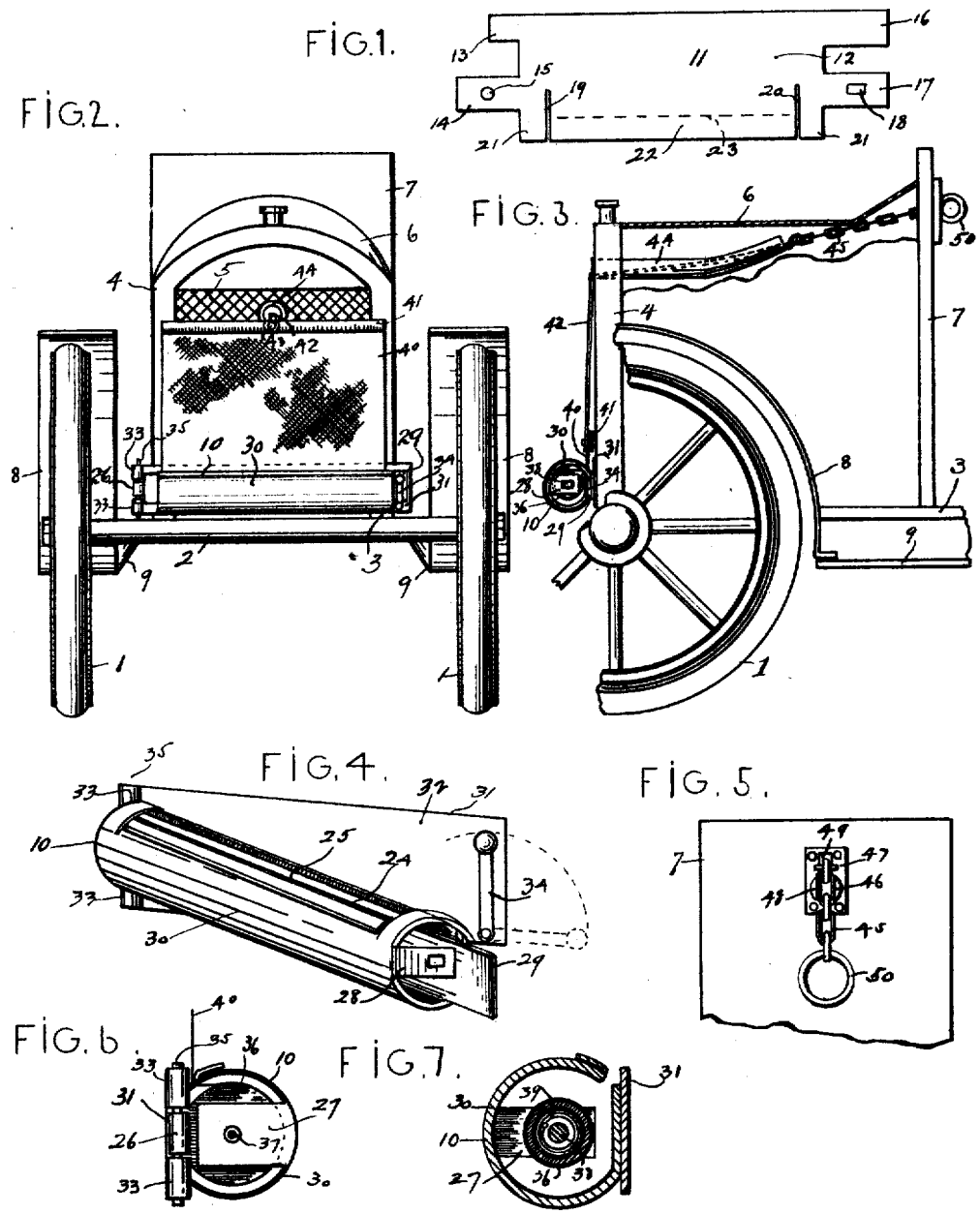

GEORGE W. PAYNE, OF KANSAS CITY, MISSOURI.

RADIATOR-SHIELD FOR AUTOMOBILES.

1,304,089.　　　　　Specification of Letters Patent.　　Patented May 20, 1919.

Application filed January 29, 1918. Serial No. 214,344.

*To all whom it may concern:*

Be it known that I, GEORGE W. PAYNE, a citizen of the United States, residing at Kansas City, in the county of Jackson and State of Missouri, have invented a new and useful Radiator-Shield for Automobiles, of which the following is a specification.

My invention relates to radiator shields for automobiles, which are employed to cover the cellular filling in the front of automobile radiators to protect the radiator and motor from freezing air, water, dust particles, and other substances.

The objects of my invention are first, to provide a simple cheap and durable roller shield, second, to provide a holder for the shield which may be hingedly attached to the radiator and having facility for the passage of the shield therefrom, third, to provide the holder with a hingedly connected attaching member having facility for engaging the free end of the holder to hold the same in place and, fourth, to provide the holder with facility for self cleaning of the shield.

I attain these objects and other advantages by means of the mechanism illustrated in the accompanying drawing in which—

Figure 1, is a plan view of the blank which is formed up tubular to make the holder; Fig. 2, is a front elevation of an automobile, and showing my invention attached to the radiator; Fig. 3, is a side elevation of an automobile front portion, the hood being broken away to disclose the means for operating the shield from the car; Fig. 4, is a perspective view of the holder, the roller shield being omitted; Fig. 5, is an elevation of a fragment of the instrument board, and showing the locking plate for detaining the shield at any desired point; Fig. 6, is a view of the hinged end of the holder, and showing the shield roller mounted therein, and, Fig. 7, is a cross section through the central portion of the holder, the attaching member being omitted.

Similar reference numerals refer to corresponding parts throughout the several views.

The wheels 1, axle 2, chassis 3, radiator 4, cellular filling 5, hood 6, instrument board 7, fenders 8, and running boards 9, comprise the parts of the front portion, or motor section of an automobile.

A shield holder 10, is preferably made from sheet metal, stamped in blank 11, having features comprising the body portion 12, the extension 13, the extension 14, having a pivot hole 15, the extension 16, the extension 17, having a slot 18, the transverse slots 19 and 20, to provide the strips 21, and foldable portion 22, having the dotted line 23, to indicate the place for doubling the portion. The blank is bent longitudinally to assume a tubular formation, so that the edges of the blank will not touch, but remain spaced apart a little distance. The inner side of the holder is flattened substantially. The portion 22, is folded back upon itself, on the folding line 23, and the edge of the fold brought close to the edge of the flattened side of the holder, but spaced apart a suitable distance to form a slotted aperture for the passage of the roller shield, hereinafter described. The fold mentioned forms a rounded edge 24, which is particularly adapted for frictionally engaging the outer side of the shield, thereby the shield is provided with facility for self cleaning. The folding back of the portion 22, effects a projection of the strips 21, and when the fold is advanced to form the slot 25, the outer ends of the strips project over and beyond the holder and bridge the slot 25, the portions of the strips outwardly of the slot are bent down upon the side of the holder. The portion 13, is bent in the form of a hinge 26, the portion 14, is bent forwardly to lie crosswise the hinged end of the holder to form a bracket 27, and the portion 17, is, also, bent forwardly to lie crosswise the free end of the holder to form a bracket 28. The pivot hole 15, in the bracket 27, and the slot 18 in the bracket 28, are brought to substantially register with each other, thus providing roller supports for the roller shield. In the operations above described, the portion 16, becomes and remains a flat extension 29. The forming up of the blanked portions in the manner described provides a simple roller shield holder 30. An attaching member 31, comprising an oblong plate 32, having hinges 33, at one end and a rotatable locking bar 34, at its opposite end, is mounted horizontally on the lower front side of the radiator. The hinge 26, on the holder 30, is entered in the hinges 33, on the attaching member and held assembled therewith by the pin 35, which engages all the hinges, whereby the holder in operative position may be swung to and from the radiator. The locking bar 34, is pivotally mounted at its lower end to the attaching member and is adapted to rotate and receive the extension 29, on the holder and clamp it with the attaching member with suitable frictional pressure. A spring actuated roller 36, provided with the customary pivot 37, and winding arbor 38, having a coiled spring 39, connected between it and the roller, is revolubly mounted in the brackets 27 and 28. A shield 40, made of any suitable water-proof material and dimensioned to screen the front of the radiator, is attached by its inner end to the roller 36, in the holder 30, and passed through the slot 25, outwardly of the holder. A bar 41, is attached to the outer end of the shield and dimensioned to prevent its being drawn into the holder. A cable 42, is attached to the bar 41, by a fastener 43, and is extended upwardly to and through a conduit 44, which is secured in the net 5, which it pierces, and a little distance beyond the conduit. A chain 45, is connected with the inner end of the cable and passed through an opening 46, in the instrument board 7, and through a locking plate 47, provided with an opening 48, similar to the opening in the instrument board and with a slot 49, which communicates with the opening 48, said slot being adapted to receive a link of the chain positioned sidewise or edgewise. A ring 50, is attached to the free end of the chain for use as a handle, the ring being large enough to prevent its being drawn through the openings in the instrument board and locking plate.

To apply my invention to the radiator of an automobile, the holder with the shield mounted therein as described, is swung backward from the attaching member, and the latter is secured on the lower portion of the front of the radiator by any suitable means, such as screws, bolts and the like fastening devices. The holder is then swung inwardly against the attaching member and the locking bar 34, is rotated inwardly to engage the outer side of the projection 29, thereby holding the holder clamped with the attaching member. The cable 42, is then passed through the locking plate 47, instrument board 7, passing within the hood 6, into and through the conduit 44, and thence down to the bar of the shield, to which it is attached. To draw the shield the cable is pulled and the shield elevated to the desired height, when the chain 45 is inserted in the slot 49 in the locking plate, the reaction of the spring roller holding the chain in place to detain the shield at the point selected. To withdraw the shield the chain is removed from the slot 49, when the shield is automatically rewound within the holder. When the shade is drawn and withdrawn, the outer side thereof frictionally engages the edge 24, on the holder, and thereby all foreign substances are removed from the shield.

Having described my invention what I claim is—

A radiator shield for automobiles, consisting of a split tubular member provided with roller supporting brackets projecting crosswise the ends of the tube, the intermediate portion of the wall of the tube at one side of the split being folded backward to provide a rounded edge, the unfolded adjacent portions forming spaced apart bridges over the opening and engaging the wall of the tube at the opposite side of the opening to adjust the width of the opening, a spring actuated shade roller inserted in the tube and supportingly engaged by said roller supporting brackets and having a flexible shield adapted to pass through said opening and frictionally engage the folded edge, means for withdrawing and detaining the shield from the tube, and an attaching member hingedly connected in parallelism with said holding member at one end and provided with a rotatable clamping bar adapted to receive and detain the free end of the holding member.

Kansas City, Missouri, January 23rd, 1918.

GEORGE W. PAYNE.

Witnesses:
J. MORGAN MARMADUKE,
JOHN C. STEARNS.

Copies of this patent may be obtained for five cents each, by addressing the "Commissioner of Patents, Washington, D. C."